United States Patent [19]

Fears

[11] Patent Number: 5,375,626
[45] Date of Patent: Dec. 27, 1994

[54] METHOD OF AND LINING FOR WATER INTAKE PIPES

[76] Inventor: Clois D. Fears, 4871 Cole Rd., Murrysville, Pa. 15668

[21] Appl. No.: 790,259

[22] Filed: Nov. 8, 1991

[51] Int. Cl.⁵ .............................................. F16L 55/00
[52] U.S. Cl. ................................... 138/103; 138/141; 428/907
[58] Field of Search ................ 138/98, 118, 103, 133, 138/141; 428/907; 264/127

[56] References Cited

U.S. PATENT DOCUMENTS

| | | | |
|---|---|---|---|
| 2,724,672 | 11/1955 | Rubin | 138/DIG. 3 |
| 2,773,781 | 12/1956 | Rodman | 138/DIG. 3 |
| 3,070,132 | 12/1962 | Sheridan | 138/118 |
| 3,167,126 | 1/1965 | Reineke, Jr. et al. | 138/133 X |
| 3,555,170 | 1/1971 | Petzetaks | 138/103 |
| 4,353,763 | 10/1982 | Simons | 138/DIG. 3 |
| 4,402,346 | 9/1983 | Cheetham et al. | 138/133 X |
| 4,606,953 | 8/1986 | Suzuki et al. | 138/146 |
| 4,789,005 | 12/1988 | Griffiths | 138/103 |
| 4,791,966 | 12/1988 | Eilentropp | 138/DIG. 3 |
| 5,167,259 | 12/1992 | Brunnhofer | 138/103 |

Primary Examiner—Frankie L. Stinson
Attorney, Agent, or Firm—James Ray & Assoc.

[57] ABSTRACT

A method and material for the manufacturing or retrofitting of fluid transport systems. The material chosen for the lining, or the pipe itself, will be selected based on physical properties such as a high impact strength and a low coefficient of friction. The low coefficient of friction will be essential to prevent the initial adhesion of foreign substances to the inner surface of pipes. In particular, an improved pipe composite will be useful in the lining or construction of water intake pipes where there is a well-recognized problem of the buildup of foreign substances including algae and other marine microorganisms. Therefore, by preventing buildup, the present invention will provide a more economical and efficient method to maintain the overall piping system.

4 Claims, 1 Drawing Sheet

METHOD OF AND LINING FOR WATER INTAKE PIPES

FIELD OF INVENTION

The present invention relates, in general, to a method and a material which will be used to line or construct fluid transport systems. In particular, this invention relates to a method and a material for the lining of or the construction of water intake pipes which will reduce the buildup of foreign materials including but not limited to marine microorganisms. Therefore, the present invention will provide a more economical and efficient method to maintain the overall piping system.

BACKGROUND OF THE INVENTION

In the modern manufacturing industry, it is a well recognized problem that there is a potential for the adherence and buildup of a variety of foreign substances on the inner surface of fluid transport system pipes. Manufacturing facilities and other processes which require the use of a particular fluid medium, such as fresh water, have sought a method to keep the fluid transport system operational and free of any foreign organisms or debris.

One such foreign organism of particular concern is known as Zebra Mollusks better known as Zebra Mussels See, for example, an article published in the December 1990 issue of "Electrical World" pages 72–74 and an article published in the Jul. 1990 issue of "The Atlantic Monthly" on pages 81–87. The contents of these articles are incorporated herein by reference thereto.

When the fluid transport systems of current technology exhibit diminished capacity due to clogging by foreign substance buildup, one method of servicing a submerged piping system would be to have a person use a dragging device to pull through the fluid transport system to dislodge the buildups or clogs and subsequently pull them through to the exit for manual cleanup. Drawbacks to this method are apparent and would include the fact that it is not only labor-intensive but time-consuming. Also this method cannot be accomplished continuously, but must be done on a scheduled basis.

Another possible cleaning method used for facilities, such as water treatment plants, includes flushing the fluid transport system with large quantities of chemicals such as chlorine or potassium permanganate. While this process can be conducted continuously, it is not efficient or cost-effective to induce large quantities of chemicals into the desired fluid medium which must later be separated out.

As discussed in the above-referenced articles, three types of problems have been identified with Zebra-Mussel fouling in water systems. Initially, layers of attached mussels will reduce or block flow, even through large-diameter piping trash racks, and traveling screens. Eventually, shells or clumps of shells breaking free of their attachment will block openings in piping, heat exchangers, strainers, or traveling screens. Finally, attachment points accumulate other debris and serve as sites for corrosion. There are three EPA-approved chemical methods that have been tried in US power-plants-chlorination, the most discussed method; bromination, primarily Acti-brom, a Nalco Chemical Co (Naperville, Ill.) product; and Betz Laboratories' (Trevose, Pa) Clam-trol. Several Other chemical treatments have been tried in laboratory tests, but not in a utility environment. Chlorination is the most common chemical control for zebra-mussel fouling. Continuous chlorination at 0.3 ppm for up to three weeks is required to achieve efficacy. Intermittent chlorination programs, that feed a few hours daily are ineffective. Using other chemicals-such as ozone, hydrogen peroxide, and potassium permangenate is possible, but expensive, environmentally unsound, and/or impractical to distribute throughout a cooling system. It has been reported that Detroit Edison is trying to control mussels by scraping and hydroblasting during regular maintenance. Janiece Romstadt has received federal permission to use a commercial mollucicide. Ontario Hydro is treating some of its coolant with hypochlorite, an oxidant that chews away at the soft parts of the organism and is the active ingredient in household bleach; the utility admits, however, that this short-term solution is offensive to a public anxious about the environment. One alternative is ozonation. Like hypochlorite, ozone is an oxidant; it is also environmentally benign. But it is extremely expensive. Ontario Hydro estimates that ozonation would cost it $9 million per plant. John Stanley, of the U.S. Fish and Wildlife Service, puts the bill for re-engineering, maintenance, and other forms of mussel abatement at almost half a billion dollars a year. But none of the emergency measures, though they may alleviate specific problems here and there, will do anything to halt the overall proliferation of Zebra Mussels. The mussels are very strongly byssate and they will attach to insides and occlude the openings of industrial and domestic pipelines, clog underground irrigation systems of farms, greenhouses, and any other facility that draws water directly from the Great Lakes, encrust navigation buoys to the point of submerging them, and encrust hulls of boats and other types of sailing craft that remain in the water over the summer and fall. . . . The mussels may also become a significant vector of parasites that are lethal to game species of waterfowl and fish.

In the November 1991 issue of "Underwater USA" a news article appeared which indicated that, the tiny but dreaded Zebra Mussel has been discovered for the first time in a section of the Mississippi River near La Crosse, Wis., a U.S. Fish and Wildlife Service toxicologist reports.

Leif Marking says he expects to see the Zebra Mussel population explode by next year. Worse, it's likely boaters will inadvertently introduce the Zebra Mussels to Minnesota lakes.

The mussels have an extremely hard shell and clog water intakes at power plants and municipal water systems.

The Monroe, Mich., water supply was crippled for three days when the mussels clogged an intake pipe. Water bills increased percent to pay for removing them.

An Ontario electric company spent $10 million on chlorine to keep the mussels out of power plant water intake pipes.

Marking expects the same things to happen at power and water plants on the Mississippi. He says locks and dams also are favored by the mussels, which cause leaks and prevent gates from closing completely.

Therefore, it is apparent that it is desirable to create a fluid transport system in which the pipes are manufactured or lined with a material which would substantially minimize the initial adherence and eventual buildup of foreign substances on the inner surfaces of the pipes while submerged in a fluid medium.

SUMMARY OF THE INVENTION

The present invention provides a method and material for retrofitting and manufacturing a fluid transport system submerged within a particular fluid medium with a lining. The retrofit can be accomplished while the pipes are submerged within the given fluid medium. The lining, composed of a preselected material, is capable of substantially minimizing both detrimental adherence to and the buildup of foreign substances on an inner surface of the pipe; thereby alleviating the problems associated with foreign substance buildups which restrict the flow of the fluid medium therethrough. The preselected lining material can be selected from a variety of possible materials, including but not limited to ultrahigh molecular weight polyethylene, polytetrafluoroethylene or a lubricating paint. Key considerations for selecting the appropriate lining material will be features such as the coefficient of friction and the inability of foreign substances to adhere to the material when submerged in a particular fluid medium.

The method to retrofit a lining within a pipe includes the first step of determining the inner diameter of the submerged pipe. After the inner pipe diameter has been determined, a first section of the lining material is installed within the submerged pipe at the inlet or outlet end thereof. The first section of lining material has a first predetermined length, a first predetermined outer diameter and a first predetermined inner diameter. Lastly, the installed lining material is secured against any lateral movement within the submerged pipe.

The next step of retrofitting the submerged pipe is to add another section of lining material in abutting engagement with the first or preceding section of lining which has already been successfully secured within the pipe. This section of lining material has a second predetermined length, a second predetermined outer diameter and a second predetermined inner diameter. The process is continued until substantially the entire length of the pipe which is submerged in the fluid medium has been lined with the preselected lining material.

When the length of submerged pipe has been substantially lined, the subsequent length of the final section of lining material can be determined. The final section of lining material will have a third predetermined outer diameter and a third predetermined inner diameter. The final section of lining material will be installed in the submerged fluid transport system at the opposite one of the previously lined inlet end or outlet end. The final section of the lining material is placed in abutting engagement with the last previously installed section of lining material. The final section is then secured as to prevent lateral movement.

In addition to a retrofit lining method, the present invention provides an improved method of manufacturing pipe for the fluid transport system which can be used in transporting preselected fluid mediums. Once again, this improved method of manufacturing, and the properties of the material itself, will both provide for a significant reduction in both an adherence to and a buildup of substantially any detrimental foreign substance on the inner surface of the piping system for an extended period of time. The actual pipe can be made of a single material component, such as a particular plastic, or as a composite, such as a fiber glass and plastic mat product. The steps necessary to manufacture the pipe begin with a determination of the length and inner diameter of pipe needed to transport the preselected fluid medium. Similar to the retrofit method, the entire length of pipe is then lined with a preselected lining material which is capable of resisting any adherence to or buildup of detrimental foreign substances on the inner surface of the pipe or lining. Finally, the lining is secured against lateral movement.

The present invention also covers methods of fluid pipe manufacture and retrofitting in which a smaller diameter lining material is used to create an annular space between the lining and pipe. A foam material is then injected into the annular space. The material then hardens and secures the lining along the length of pipe to prevent any subsequent lateral movement.

OBJECTS OF THE INVENTION

It is, therefore, one of the primary objects of the present invention to provide a method for retrofitting and a method to manufacture fluid transport systems with a material which can be used as either a lining of a pipe or the pipe itself.

Another object of the present invention is to provide a preselected material which is capable of substantially minimizing both the detrimental adherence to and buildup of foreign substances which can restrict the flow of the fluid medium through the inner surface of a pipe.

Yet another object of the present invention is to provide either a single component or composite pipe material with a low coefficient of friction and which is also durable and convenient to service.

Still another object of the present invention is to provide a low cost solution to the buildup of foreign substances to the inner surface of submerged fluid transport systems.

An additional object of the present invention is to provide a low-cost fluid transport system with excess capacity to take into account a minimum amount of adhesion and buildup of foreign substances within the pipe system.

Another object of the present invention is to provide a method of securing the preselected lining material to the fluid transport system, including but not limited to the use of a hardening foam, a mechanical means or friction itself.

A still further object of the present invention is to provide a lining material for and a method of preventing build up of Zebra-Mussels in the systems of locks and dams.

In addition to the above described objects and advantages of the present invention, various other objects and advantages of the fluid transport system and various other objects and advantages of the lining and pipe material will become more readily apparent to those persons who are skilled in the fluid transport art from the more detailed description, particularly, when such description is taken in conjunction with the attached drawing figures and with the appended claims.

DESCRIPTION OF THE PREFERRED EMBODIMENT

Figure 1:
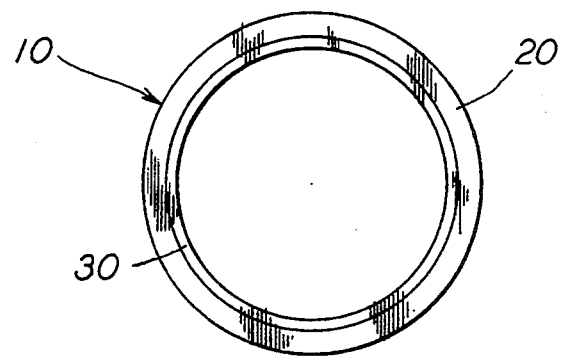
FIG. 1 is a front elevation view of an improved pipe composite configuration of the present invention.

Prior to proceeding to the more detailed description of the invention, it should be noted that identical components, having identical functions have been identified with identical reference numerals throughout the drawing Figures.

One of the main considerations when choosing a pipe material or lining will be the materials coefficient of friction. It is suggested by the present invention and by the preferred embodiment that a lining material with a low coefficient of friction, a coefficient of less than approximately 0.07, would allow a foreign substance to slide along the pipe while also preventing the initial adhesion. For instance, the foreign substance could include algae or other types of living organisms. Thus, if the foreign substance is prevented from adhering, there can be no buildup.

Another consideration in the development of the present invention was whether to manufacture a fluid transport system of one type of material or to develop a composite pipe material which would encompass a variety of properties. The list of potential materials includes but is not limited to iron, steel, aluminum, plastic, fiber glass and ceramic. In making the material choice, the fluid medium would have to be preselected.

Once the composition of the pipe material has been chosen, an appropriate lining material can be selected. For instance, a lining material can be selected from the group of materials consisting of ultrahigh molecular weight polyethylene, polytetrafluoroethylene or lubricating paints.

The next problem addressed by the present invention was how to retrofit a fluid transport system when it was operational and submerged in the fluid medium. The present invention suggests cleaning the submerged pipe and then, Starting at one end of the piping system, lining the pipe section by section. Each section is placed in abutting engagement to the preceding section and is secured to prevent any lateral movement.

Prior to the aforementioned retrofit of the submerged pipes with the lining material, it is also within the preferred embodiment of the invention to include the additional step of determining the extent of foreign substance adhering to the inner surface of the pipes in the fluid medium. When the buildup has been determined and it is found to be of a predetermined amount, the method of the present invention suggests the additional step of cleaning the foreign substance from the inner surface of the pipe prior to lining retrofit.

Referring to FIG. 1 of the drawings, there is illustrated schematically an improved pipe composite, generally designated 10. The improved pipe composite 10 consists of the outer preselected pipe casing 20 (hereinafter referred to as the "pipe casing 20") and the preselected lining material 30 (hereinafter referred to as the "lining material 30"). This simplest configuration of the preferred embodiment can be accomplished through a retrofit process or through a manufacturing process prior to the use of the improved pipe composite 10.

Retrofitting any given fluid transport system (not shown), such as water intake pipes, with a lining material 30 while the system is submerged in a fluid medium (not shown) provides the capability to substantially minimize both the detrimental adherence to and the buildup of a foreign substance (not shown) on the inner surface of the pipe casing 20. The method of retrofitting begins by first determining the inner diameter of the submerged pipe casing 20. Next, the installation of the lining material 30 can begin at either the inlet or outlet end of the fluid transport system. A section of lining material 30 is secured to the inner surface of the pipe casing 20. The lining material 30 has a first predetermined length, outer diameter and inner diameter. The process of adding lengths of lining material 30 in abutting engagement continues until the entire length of pipe casing 20 comprising the fluid transport system has been lined.

Figure 2:
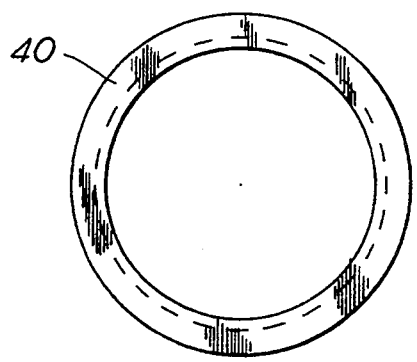
FIG. 2 is a front elevation view of an improved pipe composite, as illustrated in FIG. 1, with an end cap.

FIG. 2 illustrates schematically one method of securing the lining material 30 to the pipe casing 20. The method shown in the drawing uses an end cap 40. As mentioned previously, the end cap will prevent the lining material 30 from any lateral movement caused by a number of sources including the flow of the fluid medium itself.

Figure 3:
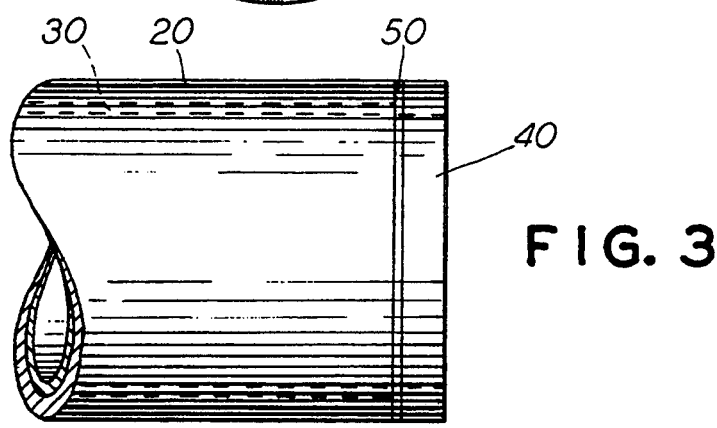
FIG. 3 is a sectional side view of an improved pipe composite with an end cap, as illustrated in FIG. 2.

FIG. 3 depicts a sectional side view of an improved pipe composite 10 using the end cap 40 securement method as shown in FIG. 2. The weld 50 secures the end cap 40 to the improved pipe composite 10.

The method of retrofitting a fluid transport system may also include the additional step of determining the extent of foreign substance adhering to the inner surface of the pipe casing 20 while the fluid transport system is still submerged in the fluid medium. Once the extent of foreign substance buildup has been determined the inner surface of the pipe casing 20 can be cleaned.

Figure 4:
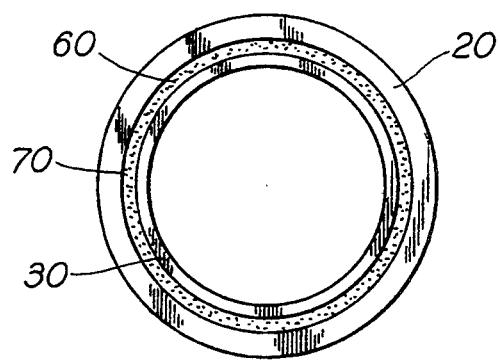
FIG. 4 is a front elevation view of the configuration of the present invention utilizing hardenable foam in the annular space of an improved pipe composite.

Another embodiment of the improved pipe composite 10 is shown schematically in FIG. 4. FIG. 4 illustrates the retrofit method in which the diameter of the inner lining material 30 is less than the diameter of the outer pipe casing 20. This difference in diameters creates an annular space 70 between the aforementioned materials. A flowable and hardenable material, such as hardenable foam 60, is then injected into the annular space 70 to secure the lining material 30 to the pipe casing 20. The injection of materials, such as hardenable foam 60, can be accomplished while the fluid transport system is still submerged in the fluid medium. A variety of foam mixtures could be used.

Lastly, other methods of securing either pre-lined or retrofitted improved pipe composites 10 are addressed in the present invention. Securing the inner casing of lining material 30 to the outer pipe casing 20 before it is submerged is a much easier task than securing lining material 30 sections during retrofit. Other methods taught for pre-submerged pipe casings 20 would include a mechanical method, such as springs, or by friction itself. It may also prove to be advantageous to the cleaning process to utilize a method of mechanical securement which is removable, such as the use of the end cap 40 illustrated in FIGS. 2 and 3. Other embodiments of the present invention can be accomplished by modifying the described and illustrated improved pipe composite 10. For instance, instead of using a retrofit process, the present invention also teaches an improved method of manufacturing a pipe composite. The manufactured pipe composite can then be used to create or replace an existing fluid transport system. The pipe composite will also prevent the buildup of foreign substances. In this embodiment, the inner pipe casing 20 and the outer lining material 30 will have substantially equal diameters. A securement means will also be used to prevent lateral movement.

Lastly, the present intention teaches the embodiment in which the fluid transport system consists of pipes made of the preselected lining material 30. In the preferred embodiment, the pipe is made of ultrahigh molecular weight polyethylene and has an impact strength of at least 38 ft. lb./sq. in. The pipe could also be fiber reinforced.

According to another important aspect of the present invention it should be noted that the lining material 30, illustrated as a pipe lining, can also be used effectively as a lining material for flat surfaces such as on locks and dams where Zebra Mussels are present to ensure that they will not adhere to these surfaces thereby eliminating the problems in closing such locks and dams.

Although certain preferred embodiments have been shown and described, it should be understood that many changes and modifications may be made therein without departing from the scope of the appended claims.

I claim:

1. A method of preventing adherence to and build up of Zebra Mussels on abutting surfaces of underwater structures exposed to said Zebra Mussels, said method comprising the step of:
   (a) selecting a lining material having a predetermined coefficient of friction, said coefficient of friction being at least sufficiently low to prevent said adherence to and build up of said Zebra Mussels on said lining material selected; and
   (b) adhering said lining material selected in step (a) to at least one flat surface of said abutting surfaces of said underwater structure; and wherein said lining material elected in step (a) is impregnated with a preselected material said Zebra Mussels will not attach themselves to.

2. A method, according to claim 1, wherein said preselected material impregnated into said lining material is selected from the group consisting of copper, potassium permanganate and mixtures thereof.

3. A method according to claim 1 wherein said lining material selected in step (a) is a lining material selected from the group consisting of ultrahigh molecular weight polyethylene, polytetrafluoroethylene, and lubricating paints and is impregnated with a preselected material said Zebra Mussels will avoid.

4. A method according to claim 3 wherein said preselected material said Zebra Mussels will avoid is selected from the group consisting of copper, potassium permanganate, and mixtures thereof.

* * * * *

UNITED STATES PATENT AND TRADEMARK OFFICE
CERTIFICATE OF CORRECTION

PATENT NO. : 5,375,626
DATED : December 27, 1994
INVENTOR(S) : Clois D. Fears

It is certified that error appears in the above-indentified patent and that said Letters Patent is hereby corrected as shown below:

Column 1, line 30, delete "Jul." and insert —July—.

Column 2, line 56, after increased, please insert —18—.

Column 5, line 34, delete "-" before present;

column 5, line 38, delete "Starting" and insert "starting".

Signed and Sealed this

Seventh Day of March, 1995

*Attest:*

BRUCE LEHMAN

*Attesting Officer*    *Commissioner of Patents and Trademarks*